US012498166B2

(12) United States Patent
Son et al.

(10) Patent No.: US 12,498,166 B2
(45) Date of Patent: Dec. 16, 2025

(54) REFRIGERATOR

(71) Applicant: SAMSUNG ELECTRONICS CO., LTD., Suwon-si (KR)

(72) Inventors: Jonghyun Son, Suwon-si (KR); Byoungmok Kim, Suwon-si (KR); Taecheol Park, Suwon-si (KR); Jeonghyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 18/084,036

(22) Filed: Dec. 19, 2022

(65) Prior Publication Data

US 2023/0125013 A1 Apr. 20, 2023

Related U.S. Application Data

(63) Continuation of application No. PCT/KR2021/005143, filed on Apr. 23, 2021.

(30) Foreign Application Priority Data

Jun. 19, 2020 (KR) ........................ 10-2020-0075013
Nov. 26, 2020 (KR) ........................ 10-2020-0161449

(51) Int. Cl.
*F25D 23/02* (2006.01)
*E05D 11/00* (2006.01)
*F25D 23/06* (2006.01)

(52) U.S. Cl.
CPC ........ *F25D 23/025* (2013.01); *E05D 11/0054* (2013.01); *E05D 11/0081* (2013.01);
(Continued)

(58) Field of Classification Search
CPC .... F25D 23/025; F25D 23/028; F25D 23/063; F25D 2223/023; F25D 2223/024;
(Continued)

(56) References Cited

U.S. PATENT DOCUMENTS 4,891,626 A * 1/1990 Neuman ................ G08B 21/18
200/61.69
5,056,192 A 10/1991 Grass
(Continued)

FOREIGN PATENT DOCUMENTS

CN 1532497 A 9/2004
EP 3040661 B1 2/2018
(Continued)

OTHER PUBLICATIONS

International Search Report (PCT/ISA/210) issued Aug. 24, 2021 by the International Searching Authority in International Application No. PCT/KR2021/005143.
(Continued)

*Primary Examiner* — James O Hansen
(74) *Attorney, Agent, or Firm* — Sughrue Mion, PLLC

(57) ABSTRACT

A refrigerator includes: a main body including a storage area; an inner door including a door storage space, the inner door being rotatably coupled with the main body; an outer door; and a hinge rotatably coupling the outer door with the inner door, the hinge including a hinge bracket that includes a fixing plate coupled with the inner door, and a hinge shaft on which the outer door is rotatable, wherein the inner door further includes a front plate forming a front surface of the inner door, and an upper cap coupled with an upper end of the front plate, wherein the front plate includes a through hole, and wherein the hinge bracket penetrates the through hole such that the fixing plate is coupled with the upper cap.

15 Claims, 11 Drawing Sheets

(52) U.S. Cl.
CPC ......... *F25D 23/028* (2013.01); *F25D 23/063* (2013.01); *E05Y 2400/445* (2013.01); *E05Y 2900/31* (2013.01)

(58) Field of Classification Search
CPC ............. F25D 2700/02; E05D 11/0054; E05D 11/0081; E05Y 2400/445; E05Y 2900/31
USPC ........................................................ 312/405
See application file for complete search history.

(56) References Cited

U.S. PATENT DOCUMENTS

| | | | |
|---|---|---|---|
| 8,491,070 | B2 | 7/2013 | Davis et al. |
| 8,926,033 | B2 | 1/2015 | Chen et al. |
| 9,115,928 | B2 | 8/2015 | Akalan et al. |
| 10,408,529 | B2 | 9/2019 | Grimminger et al. |
| 2010/0109497 | A1 | 5/2010 | Blersch et al. |
| 2010/0154457 | A1 | 6/2010 | Kim et al. |
| 2010/0320890 | A1 | 12/2010 | Jung et al. |
| 2016/0061511 | A1* | 3/2016 | Park ...................... F25D 23/025 312/405 |
| 2018/0187952 | A1 | 7/2018 | Lv et al. |
| 2019/0017742 | A1* | 1/2019 | Post ........................ F25D 23/02 |
| 2019/0086141 | A1* | 3/2019 | Kim ......................... B21D 5/00 |
| 2019/0368247 | A1 | 12/2019 | Carbone et al. |

FOREIGN PATENT DOCUMENTS

| | | | |
|---|---|---|---|
| JP | S 56-174678 | U | 12/1981 |
| KR | 10-0733309 | B1 | 6/2007 |
| KR | 10-2010-0085247 | A | 7/2010 |
| KR | 10-2011-0005940 | A | 1/2011 |
| KR | 10-2011-0138772 | A | 12/2011 |
| KR | 10-2014-0104639 | A | 8/2014 |
| KR | 10-2015-0096945 | A | 8/2015 |
| KR | 10-2018-0013178 | A | 2/2018 |
| KR | 10-1862564 | B1 | 5/2018 |
| KR | 10-2100252 | B1 | 4/2020 |

OTHER PUBLICATIONS

Written Opinion (PCT/ISA/237) issued Aug. 24, 2021 by the International Searching Authority in International Application No. PCT/KR2021/005143.

Communication dated Sep. 21, 2023, issued by the European Patent Office in European Application No. 21825681.6.

Communication issued Nov. 27, 2024 by the European Patent Office in European Patent Application No. 21 825 681.6.

* cited by examiner

REFRIGERATOR

CROSS-REFERENCE TO RELATED APPLICATIONS

This application is a bypass continuation application of International Application No. PCT/KR2021/005143, filed on Apr. 23, 2021, which claims priority to Korean Patent Application No. 10-2020-0075013, filed on Jun. 19, 2020, and Korean Patent Application No. 10-2020-0161449, filed on Nov. 26, 2020 the disclosures of which are herein incorporated by reference in their entireties.

BACKGROUND

1. Field

The disclosure relates to a refrigerator, and more particularly, to a refrigerator including an inner door having a door storage space, and an outer door being rotatable with respect to the inner door.

2. Description of Related Art

A refrigerator may include a main body having a storage area, and a cool air supplier for supplying cool air to the storage space to keep food fresh. The storage area may include a refrigerating area that is maintained at about 0° C. to 5° C. to keep food refrigerated and a freezing area that is maintained at about 0° C. to −30° C. (30 degrees below zero) to keep food frozen. The storage area opens at the front side to put food in or take food out, and the open front side of the storage area is opened or closed by a door.

The door is configured with an inner door providing a door storage space, and an outer door rotatably coupled with the inner door to open or close the door storage space. A front plate of the inner door is cut at the upper corner portion, and a hinge connecting the inner door with the outer door is installed at the cut portion.

A reed switch and a magnet are provided to detect an opening/closing of the outer door, and generally, the reed switch and the magnet are installed horizontally.

SUMMARY

Provided is a refrigerator capable of minimizing exposure of a hinge connecting an inner door with an outer door and a hinge cover covering the hinge.

Further, provided is a refrigerator capable of securing a separation distance between a reed switch and a magnet without increasing a thickness of an outer door.

In accordance with an aspect of the disclosure, a refrigerator includes: a main body including a storage area; an inner door including a door storage space, the inner door rotatably coupled with the main body; an outer door rotatably coupled with the inner door; and a hinge including a hinge bracket that includes a fixing plate coupled with the inner door, and a hinge shaft forming a rotating shaft of the outer door, wherein the inner door includes a front plate forming a front surface of the inner door, and an upper cap coupled with an upper end of the front plate, wherein the front plate includes a through hole, and wherein the hinge bracket is configured to penetrate the through hole such that the fixing plate is coupled with the upper cap.

According to an aspect of the disclosure, a refrigerator includes: a main body including a storage area; an inner door including a door storage space, the inner door being rotatably coupled with the main body; an outer door; and a hinge rotatably coupling the outer door with the inner door, the hinge including a hinge bracket that includes a fixing plate coupled with the inner door, and a hinge shaft on which the outer door is rotatable, wherein the inner door further includes a front plate forming a front surface of the inner door, and an upper cap coupled with an upper end of the front plate, wherein the front plate includes a through hole, and wherein the hinge bracket penetrates the through hole such that the fixing plate is coupled with the upper cap.

The through hole may be spaced apart from an upper edge of the front plate and from both side edges of the front plate.

The upper cap may include a flat installing portion contacting the fixing plate, and the refrigerator may further include a coupling member coupling the fixing plate is coupled with the flat installing portion.

The upper cap may include an upper cap hole corresponding to the through hole, and the hinge bracket may penetrate the upper cap hole.

The refrigerator may further include a hinge cover covering a portion of the hinge bracket, the portion being exposed to an outside of the inner door.

The hinge cover may penetrate the through hole.

The refrigerator may further include a reed switch configured to detect opening and closing of the outer door, and the reed switch may be provided on the hinge cover.

The hinge cover may include an upper cover covering an upper surface of the hinge, and a side cover covering a side surface of the hinge, and the reed switch is provided on the upper cover.

The upper cover may include a switch supporter supporting an edge of the reed switch, and the upper cover may include an opening that the reed switch penetrates.

The refrigerator may further include a wire connected with the reed switch and configured to supply electricity to the reed switch, and the wire may pass through the through hole.

The wire may include: a first wire having a first end connected with a power supply of the main body, and a second end at which a first connector is provided; and a second wire having a first end connected with the reed switch, and a second end at which a second connector is provided, the second connector being coupled with the first connector, and the first connector and the second connector may be positioned in a hinge accommodating space formed in the upper cap.

The refrigerator may further include a magnet provided on the outer door and configured to interwork with the reed switch.

In a closed state of the outer door, the reed switch and the magnet may be positioned vertically.

The outer door may include a hinge accommodating groove depressed in a rear surface of the outer door and configured to accommodate the hinge cover in a closed state of the outer door.

The outer door may include a magnet mounting groove on which the magnet is mounted, and the magnet mounting groove may be formed above the hinge accommodating groove.

According to an aspect of the disclosure, a refrigerator includes: a refrigerator door including an inner door and an outer door, the inner door being coupled with a main body, and the outer door being coupled with the inner door; and a reed switch configured to detect opening and closing of the outer door based on an interworking between the reed switch and a magnet, wherein the reed switch and the magnet are positioned vertically with respect to each other when the refrigerator door is closed.

The reed switch may be further configured to detect the refrigerator door is closed based on a distance between the reed switch and the magnet being less than a predetermined distance.

The inner door may include a front plate forming a front surface of the inner door, and an upper cap coupled with an upper end of the front plate.

The refrigerator may further include: a hinge including a hinge bracket coupled with the inner door; and a hinge cover covering a portion of the hinge bracket that is exposed to an outside of the inner door.

The reed switch may be provided on the hinge cover.

According to one or more embodiments, by minimizing exposure of a hinge connecting an inner door with an outer door, and a hinge cover covering the hinge, an outer appearance may be improved.

According to one or more embodiments, a separation distance between a magnet and a reed switch for detecting an opening/closing of an outer door may be secured without increasing a thickness of the outer door.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The embodiments described below do not represent all technical aspects of the disclosure. It should be understood that various equivalents or variations that may be substituted for them at the time of the present application belong to the scope of rights of the disclosure.

It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, it will be understood that, although the terms including ordinal numbers, such as "first", "second", etc., may be used herein to describe various components, these components should not be limited by these terms. These terms are only used to distinguish one component from another.

Hereinafter, embodiments will be described in detail with reference to the accompanying drawings.

Figure 1:
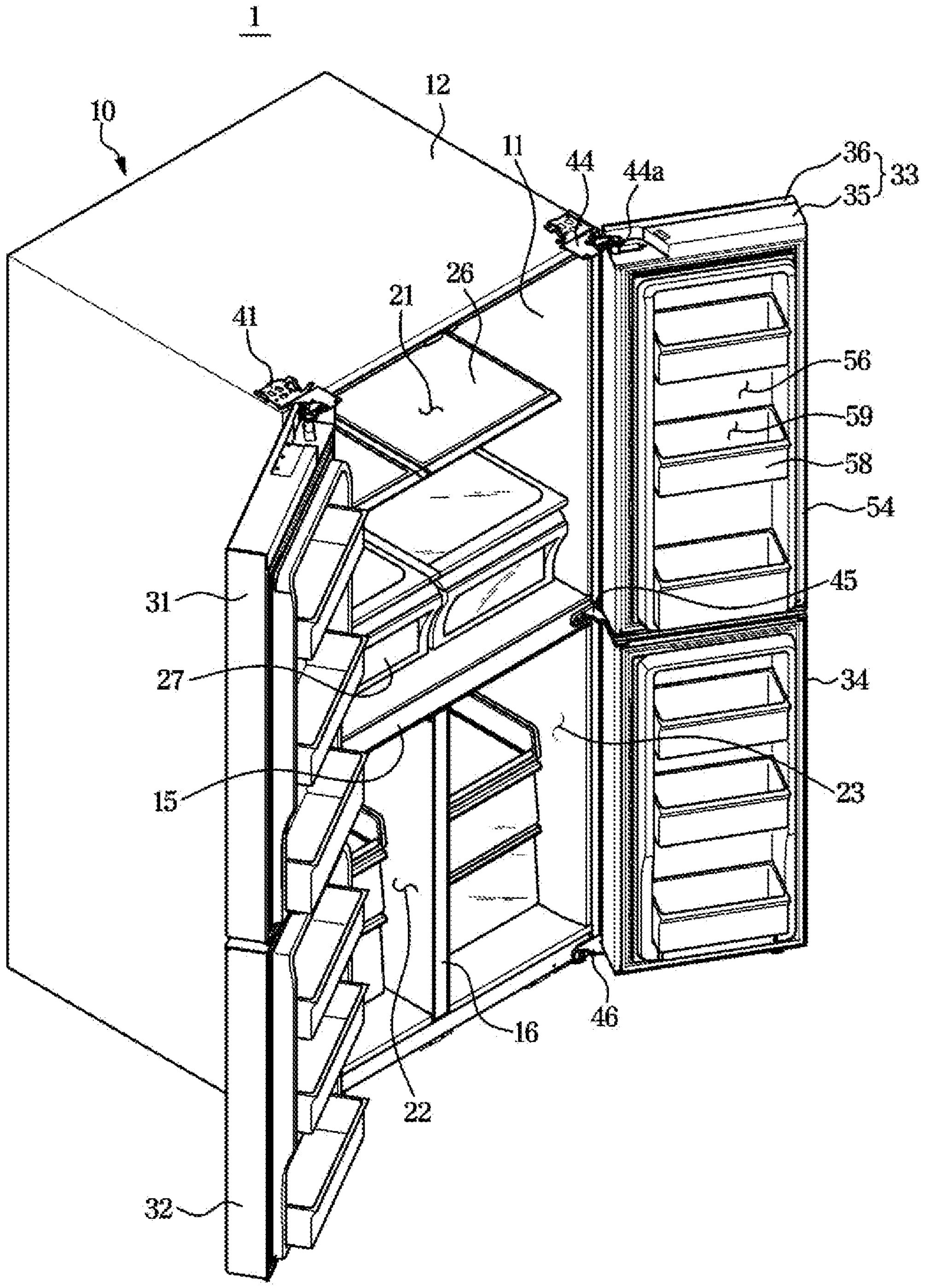
FIG. 1 is a perspective view showing an outer appearance of a refrigerator, according to an embodiment.

FIG. 1 is a perspective view showing an outer appearance of a refrigerator according to an embodiment.

Referring to FIG. 1, a refrigerator 1 may include a main body 10, storage areas 21, 22, and 23 formed inside the main body 10, doors 31, 32, 33, and 34 for opening or closing the storage areas 21, 22, and 23, and a cool air supplier for supplying cool air to the storage areas 21, 22, and 23.

The main body 10 may include an inner case 11 forming the storage areas 21, 22, and 23, an outer case 12 coupled with an outer side of the inner case 11 and forming an outer appearance, and an insulation provided between the inner case 11 and the outer case 12 to insulate the storage areas 21, 22, and 23.

The storage areas 21, 22, and 23 may be partitioned into a plurality of rooms by a horizontal partition wall 15 and a vertical partition wall 16. The storage areas 21, 22, and 23 may be partitioned into an upper storage area 21 and lower storage areas 22 and 23 by the horizontal partition wall 15, and the lower storage areas 22 and 23 may be partitioned into a left lower storage area 22 and a right lower storage area 23 by the vertical partition wall 16.

The upper storage area 21 may be used as a refrigerating area, and the lower storage areas 22 and 23 may be used as freezing areas. The above-described partitioning and uses of the storage areas 21, 22, and 23 are only examples, which are not limited.

Inside the storage areas 21, 22, and 23, a shelf 26 on which food is put and a storage container 27 in which food is stored may be provided.

The cool air supplier may generate cool air by using a cooling circulation cycle of compressing, condensing, expanding, and evaporating a refrigerant, and supply the generated cool air to the storage areas 21, 22, and 23.

The upper storage area 21 may be opened or closed by a pair of doors 31 and 33. The doors 31 and 33 may be rotatably coupled with the main body 10. The left lower storage area 22 may be opened or closed by a door 32, and the door 32 may be rotatably coupled with the main body 10. The right lower storage area 23 may be opened or closed by a door 34, and the door 34 may be rotatably coupled with the main body 10. In the main body 10, upper hinges 41 and 44, a middle hinge 45, and a lower hinge 46 may be provided to rotatably couple the doors 31, 32, 33, and 34 with the main body 10.

Any one or any combination of the doors 31, 32, 33, and 34 may include a door guard 58 having a door storage space 59 in which food is stored. On a rear surface of each of the doors 31, 32, 33, and 34, a gasket 54 that closely contacts a front surface of the main body 10 may be provided to seal the storage areas 21, 22, and 23.

Figure 2:
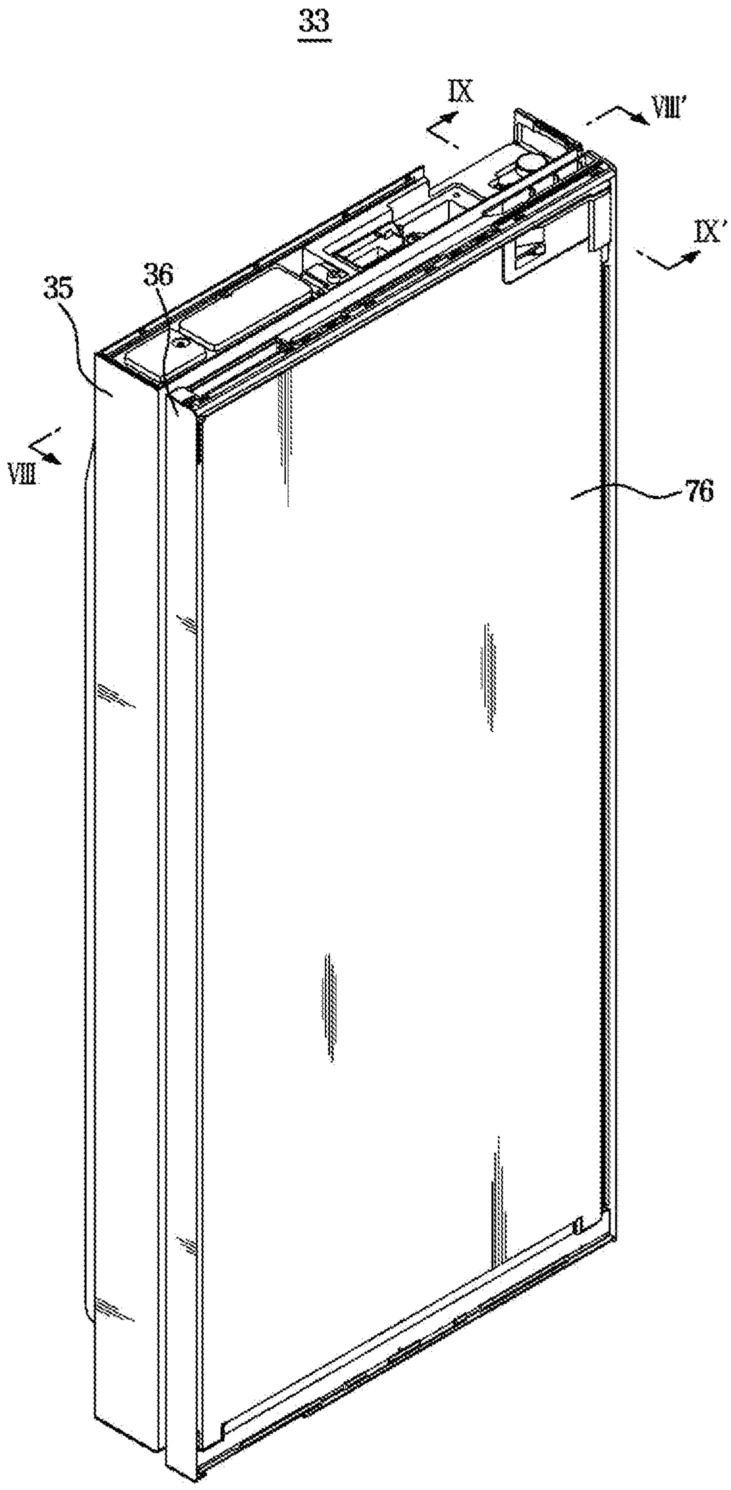
FIG. 2 is a perspective view showing a closed state of an outer door and an inner door in a refrigerator, according to an embodiment.

FIG. 2 is a perspective view showing a closed state of an outer door and an inner door in a refrigerator according to an embodiment. Any one or any combination of doors 31, 32, 33, or 34 may be configured as a double door having an inner door and an outer door. For example, as illustrated in FIG. 2, the right upper door 33 may include an inner door 35 and an outer door 36 with an outer surface 76.

As illustrated in FIG. 1, the inner door 35 may have the door storage space 59 where food is stored and may be rotatably coupled with the main body 10. The inner door 35 may have an opening 56. In a closed state of the inner door 35, an access to the storage area 21 may be allowed through the opening 56.

The door guard 58 having the door storage space 59 may be coupled with the opening 56. The inner door 35 may be rotatably coupled with the main body 10 by the hinges 44 and 45. The hinge 44 may include a hinge shaft **44*a* forming a rotating shaft of the inner door 35, and the hinge shaft 44*a* may be inserted in an upper end of the inner door 35**.

The outer door 36 may open or close the door storage space 59 of the inner door 35. By opening the outer door 36, an access to the door storage space 59 of the inner door 35 may be allowed. The outer door 36 may be rotatably coupled with the inner door 35. The outer door 36 may rotate in the same direction as the inner door 35.

The outer door 36 may correspond to a size of the inner door 35. The outer door 36 may cover an entire area of the inner door 35.

Figure 3:
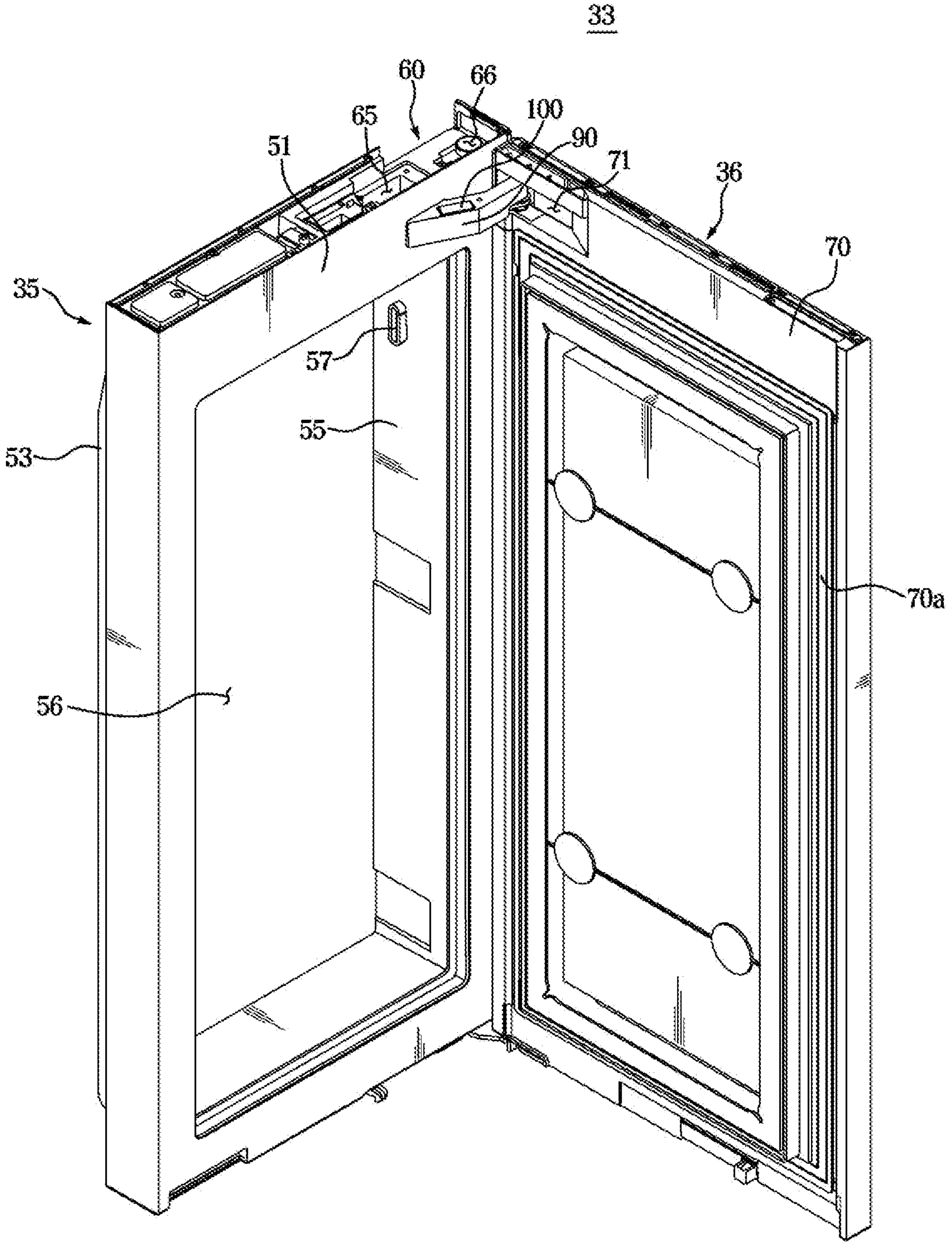
FIG. 3 is a perspective view showing an open state of an outer door in a refrigerator, according to an embodiment.
Figure 4:
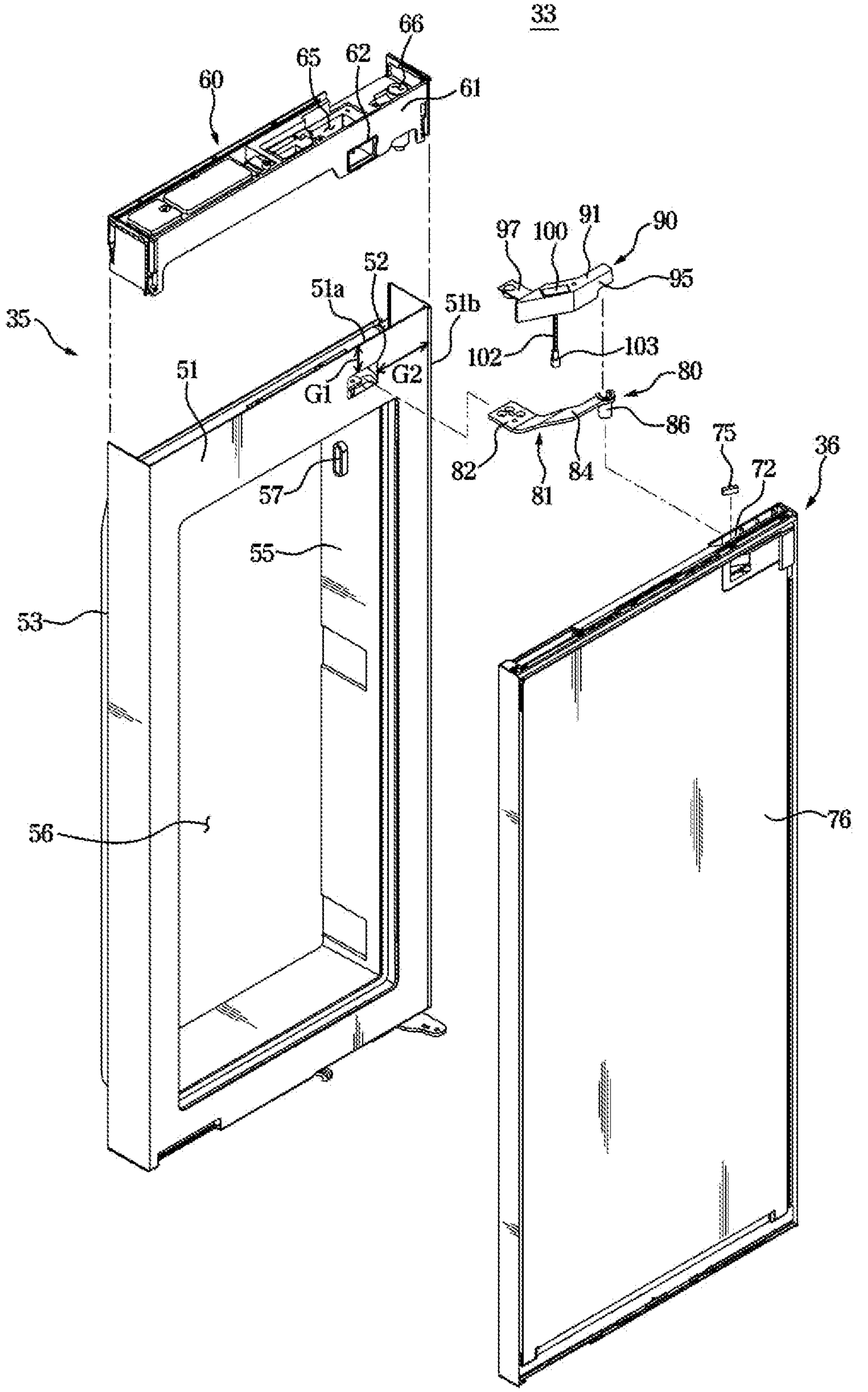
FIG. 4 is an exploded perspective view showing an outer door and an inner door in a refrigerator, according to an embodiment.
Figure 5:
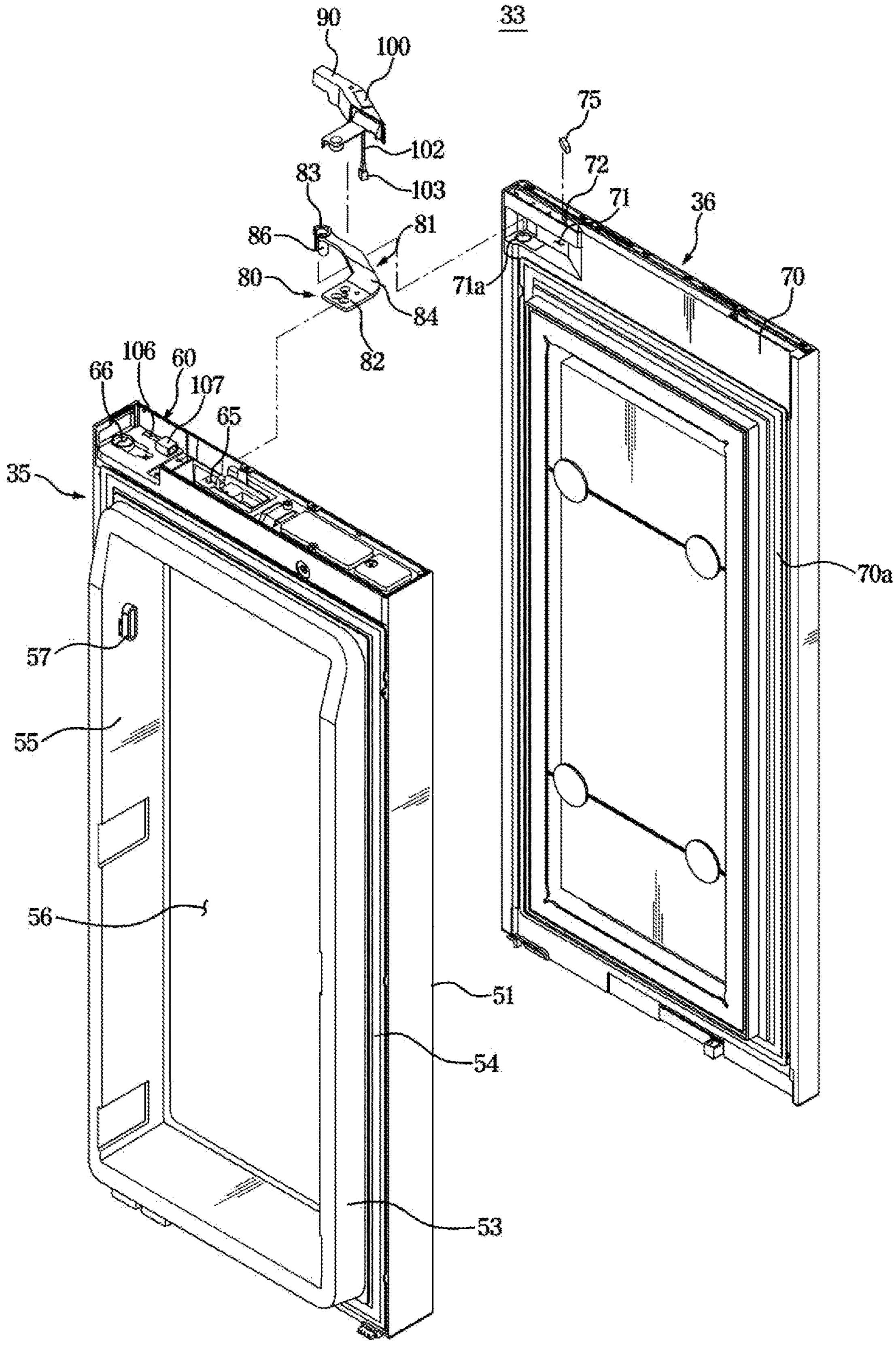
FIG. 5 is an exploded perspective view showing an outer door and an inner door at another angle in a refrigerator, according to an embodiment.

As illustrated in FIGS. 3, 4, and 5, the outer door 36 may be rotatably coupled with the inner door 35 by a hinge 80. On a rear surface of the outer door 36, a gasket **70*a* may be provided to closely contact a front surface of the inner door 35. A decoration panel may be detachably coupled with a front surface of the outer door 36. The refrigerator may include a magnet 75 and a reed switch 100 for detecting an opening or closing of the outer door 36**.

Hereinafter, the inner door 35, the outer door 36, the hinge 80 for rotatably coupling the outer door 36 with the inner door 35, and the magnet 75 and the reed switch 100 for detecting opening or closing of the outer door 36 will be described.

Figure 6:
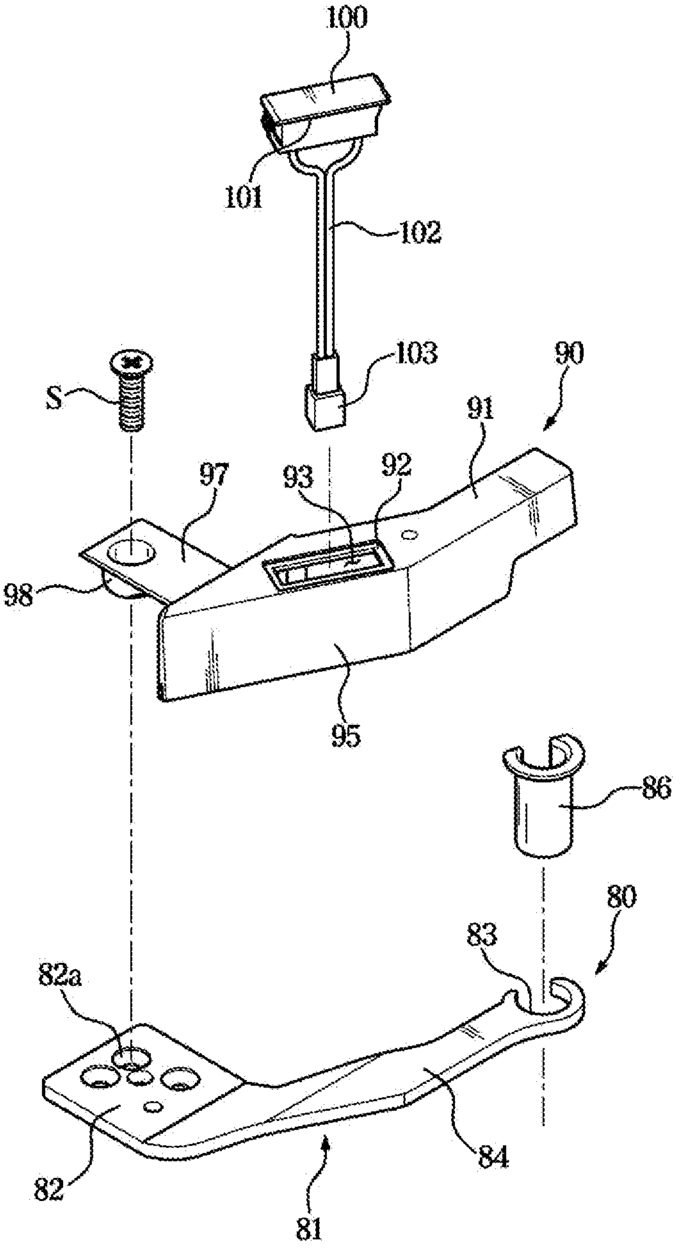
FIG. 6 is an exploded view showing a hinge, a hinge cover, and a reed switch in a refrigerator, according to an embodiment.
Figure 7:
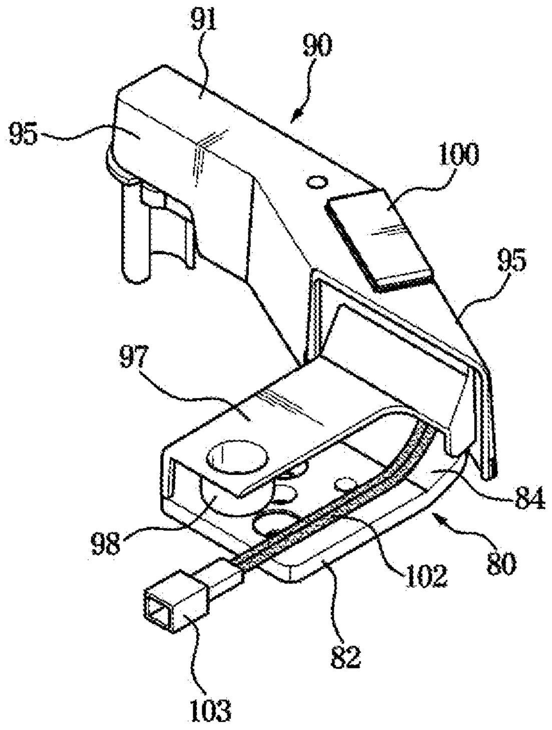
FIG. 7 shows a coupled state of a hinge, a hinge cover, and a reed switch in a refrigerator, according to an embodiment.
Figure 8:
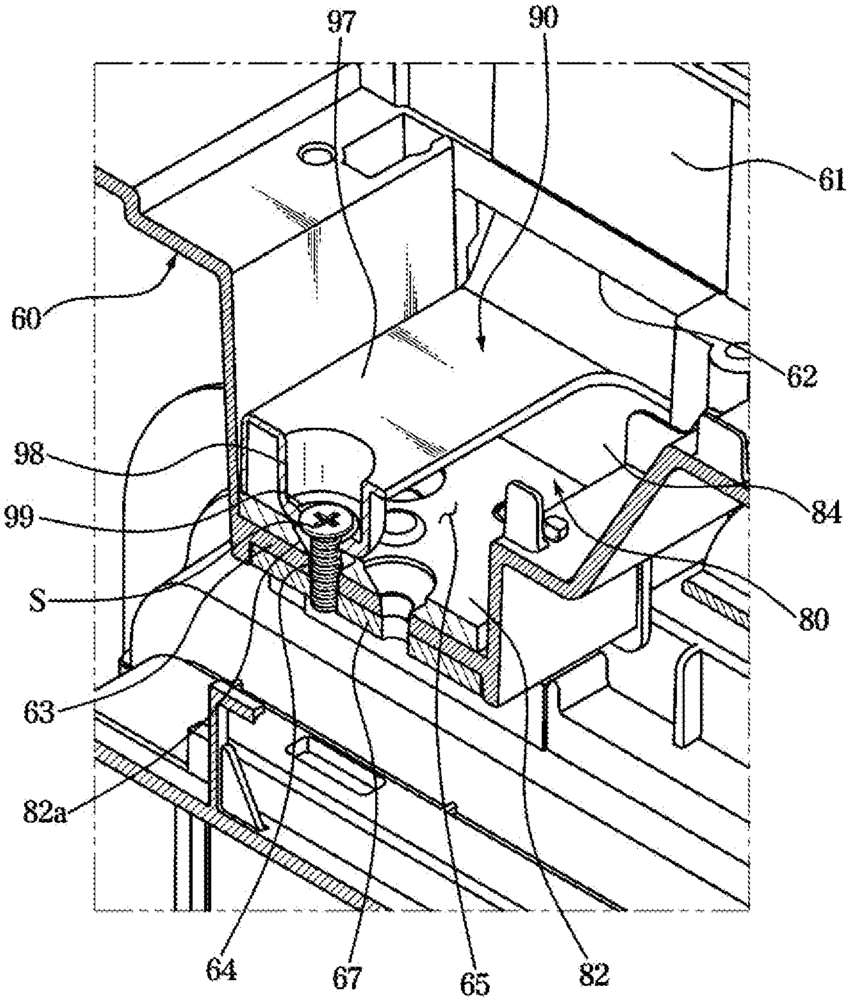
FIG. 8 is a cross-sectional view taken along line VIII-VIII' of FIG. 2, according to an embodiment.
Figure 9:
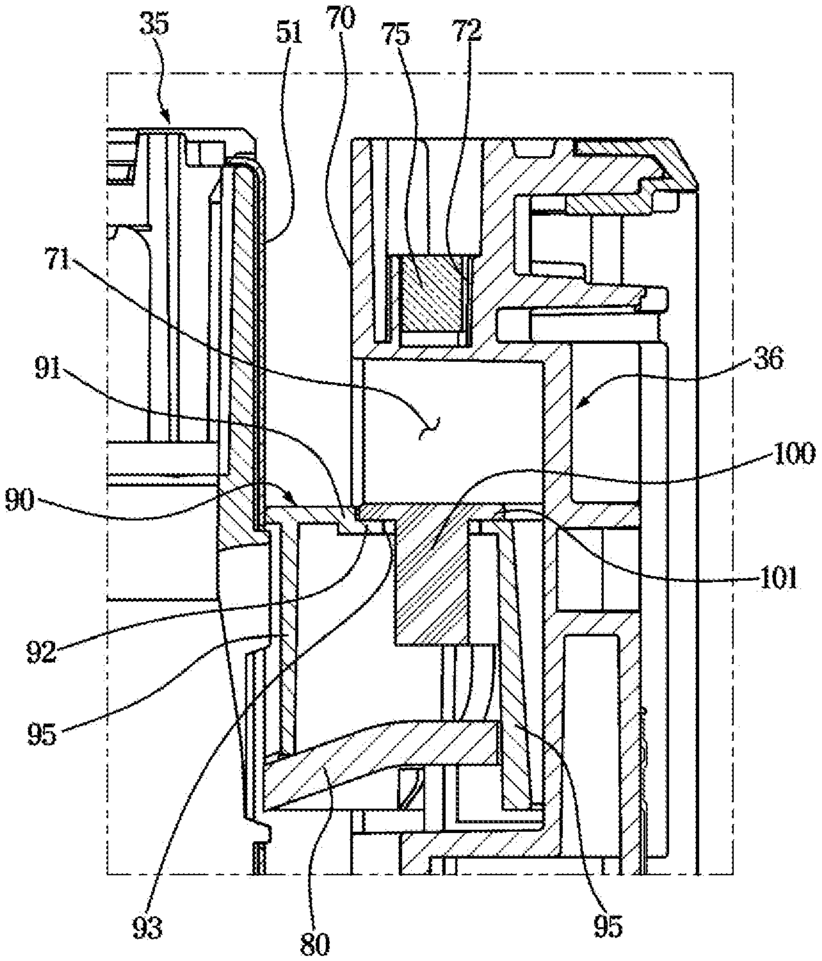
FIG. 9 is a cross-sectional view taken along line IX-IX' of FIG. 2, according to an embodiment.

FIG. 2 is a perspective view showing a closed state of an outer door and an inner door in a refrigerator according to an embodiment of the disclosure. FIG. 3 is a perspective view showing an open state of an outer door in a refrigerator according to an embodiment of the disclosure. FIG. 4 is an exploded perspective view showing an outer door and an inner door in a refrigerator according to an embodiment of the disclosure. FIG. 5 is an exploded perspective view showing an outer door and an inner door at another angle in a refrigerator according to an embodiment of the disclosure. FIG. 6 is an exploded view showing a hinge, a hinge cover, and a reed switch in a refrigerator according to an embodiment of the disclosure. FIG. 7 shows a coupled state of a hinge, a hinge cover, and a reed switch in a refrigerator according to an embodiment of the disclosure. FIG. 8 is a cross-sectional view taken along line VIII-VIII' of FIG. 2. FIG. 9 is a cross-sectional view taken along line IX-IX' of FIG. 2.

As illustrated in FIGS. 3, 4, and 5, the inner door 35 may include a front plate 51 and a rear plate 53. The front plate 51 may form a front surface and both side surfaces of the inner door 35. The rear plate 53 may form a rear surface and inner side surfaces 55 of the inner door 35. An insulation may be provided between the front plate 51 and the rear plate 53.

The opening 56 may be formed along the inner side surfaces 55 of the inner door 35. In the opening 56, the door guard 58 having the door storage space 59 may be installed. On the inner side surfaces 55 of the inner door 35, an installing protrusion 57 on which the door guard 58 is installed may be formed.

As illustrated in FIGS. 3 and 4, an upper cap 60 may be coupled with upper ends of the front plate 51 and the rear plate 53. The upper cap 60 may be formed of a resin material that is easily molded. The hinge 44 for rotatably coupling the inner door 35 with the main body 10 may be coupled with the upper cap 60. More specifically, a shaft hole 66 in which the hinge shaft **44*a* of the hinge 44 is inserted may be formed in the upper cap 60**.

The refrigerator may include the hinge 80 for rotatably coupling the outer door 36 with the inner door 35. The hinge 80 may include a hinge bracket 81 fixed to the inner door 35 and extending from the inner door 35 toward the outer door 36, and a hinge shaft 86 coupled with the hinge bracket 81 and forming a rotating shaft of the outer door 36.

The hinge bracket 81 may be formed with an iron plate. The hinge bracket 81 may include a fixing plate 82 fixed to the inner door 35, a hinge shaft coupling portion 83 with which the hinge shaft 86 is coupled, and an extension portion 84 formed between the fixing plate 82 and the hinge shaft coupling portion 83. The fixing plate 82 may be flat. The hinge shaft coupling portion 83 may include an opening which the hinge shaft 86 is inserted into and coupled with.

As illustrated in FIG. 5, the hinge shaft 86 may be inserted in a shaft hole **71*a* of the outer door 36, and form the rotating shaft of the outer door 36. In the current embodiment, the hinge shaft 86 may be provided separately from the hinge bracket 81. However, the hinge shaft 86 may be integrated into the hinge bracket 81**.

The fixing plate 82 may be coupled with the upper cap 60 by penetrating the front plate 51 of the inner door 35. For this, a through hole 52 which the hinge 80 penetrates may be formed in the front plate 51. The through hole 52 may be spaced a preset gap G1 from an upper edge **51*a* of the front plate 51. The through hole 52 may be spaced a preset gap G2 from a side edge 51*b* of the front plate 51**.

As such, because the hinge bracket 81 penetrates the through hole 52 of the front plate 51, notching (cutting) a corner of the front plate 51 to install the hinge bracket 81 may be not required. Also, because the hinge bracket 81 and a hinge cover 90 which will be described below are inserted into inside of the inner door 35 through the through hole 52, exposure of the hinge bracket 81 and the hinge cover 90 may be minimized, resulting in an improvement of a design.

As illustrated in FIG. 8, the fixing plate 82 of the hinge bracket 81 may pass through the through hole 52 of the front plate 51 and be positioned inside the inner door 35. The fixing plate 82 of the hinge bracket 81 may be coupled with the upper cap 60. For this, the upper cap 60 may include an installing portion 63 being flat to be in close contact with the fixing plate 82.

The installing portion 63 of the upper cap 60 may extend substantially horizontally. That is, the installing portion 63 of the upper cap 60 may be formed to be vertical to the front plate 51. Accordingly, the fixing plate 82 of the hinge bracket 81 may extend substantially horizontally to correspond to the installing portion 63.

The upper cap 60 may include a hinge accommodating space 65 formed by being depressed at one surface to accommodate the fixing plate 82 of the hinge bracket 81, and the installing portion 63 may form a lower surface of the hinge accommodating space 65.

The fixing plate 82 may be firmly coupled with the installing portion 63 by a coupling member S. For this, a coupling hole 82*a* into which the coupling member S is inserted may be formed in the fixing plate 82, and a coupling hole 64 into which the coupling member S is inserted may be formed in the installing portion 63. The coupling member S may include various mechanical elements for coupling, such as a screw, a nail, a rivet, a pin, etc.

The fixing plate 82 may be in close contact with one surface of the installing portion 63, and a reinforcing plate 67 for reinforcing a coupling force of the coupling member S may be provided on the other surface of the installing portion 63.

The upper cap 60 may include an upper cap front portion 61 that is in close contact with a rear surface of the front plate 51. In the upper cap front portion 61, an upper cap hole 62 may be formed to correspond to the through hole 52 formed in the front plate 51. Accordingly, the hinge bracket 81 may penetrate the through hole 52 and the upper cap hole 62.

An upper end of the upper cap 60 may be coupled with an upper cover to cover the hinge accommodating space 65 of the upper cap 60.

By this structure, the fixing plate 82 of the hinge bracket 81 may be positioned inside the inner door 35 not to be exposed to outside. However, because the extension portion 84 of the hinge bracket 81 is positioned outside the inner door 35, the hinge cover 90 may be coupled with the hinge bracket 81 to cover such a portion of the hinge bracket 81, exposed to the outside of the inner door 35.

The hinge cover 90 may have a section being substantially in a shape of '⊏', and extend from the fixing plate 82 of the hinge bracket 81 to the hinge shaft 86. The hinge cover 90 may include an upper cover 91, and both side covers 95 extending downward from both ends of the upper cover 91.

The hinge bracket 81 may be inserted in lower ends of the both side covers 95 of the hinge cover 90. In this case, the upper cover 91 may be spaced a preset gap from the hinge bracket 81.

Also, the hinge cover 90 may be coupled with the upper cap 60 through a coupling member S. Accordingly, a portion fixing the hinge cover 90 may be positioned inside the inner door 35 and not exposed to the outside.

In this case, the hinge bracket 81 and the hinge cover 90 may be coupled with the upper cap 60 through the same coupling member S. For this, the hinge cover 90 may include an insertion portion 97 configured to be inserted in the inside of the inner door 35.

The insertion portion 97 may be inserted into the inside of the inner door 35 through the through hole 52 of the front plate 51, like the fixing plate 82 of the hinge 80. In the insertion portion 97, a boss 98 protruding downward may be formed, and the boss 98 may be positioned above the fixing plate 82 of the hinge bracket 81. In the boss 98, a coupling hole 99 in which the coupling member S is inserted may be formed.

Accordingly, the coupling member S may be coupled by passing through the coupling hole 99 of the hinge cover 90, the coupling hole 82*a* of the fixing plate 82, and the coupling hole 64 of the installing portion 63 of the upper cap 60. That is, a single coupling member S may couple both the hinge cover 90 and the hinge bracket 81 with the upper cap 60.

In the hinge cover 90, the reed switch 100 for detecting opening or closing of the outer door 36 may be provided. The reed switch 100 may detect opening or closing of the outer door 36 by interworking with the magnet 75 provided in the outer door 36.

The reed switch 100 may include two reeds, wherein the two reeds may attract each other to close a contact point according to an approach of the magnet 75 within a preset distance and, according to a moving-away of the magnet 75 out of the preset distance, the two reeds may be separated from each other by elasticity to open the contact point. Alternatively, in contrast, the contact point may open according to an approach of the magnet 75 to the reed switch 100, and according to a moving-away of the magnet 75 from the reed switch 100, the contact point may be closed.

By this configuration, the reed switch 100 may detect opening or closing of the outer door 36, and a light, etc. provided inside the storage area may be turned on or off according to the opening or closing of the outer door.

As illustrated in FIGS. 6 and 7, the reed switch 100 may be mounted on the upper cover 91 of the hinge cover 90. For this, in the upper cover 91, a switch supporter 92 forming a step with an upper surface of the upper cover 91 to support an edge 101 of the reed switch 100 may be formed in the upper cover 91. In a center portion of the switch supporter 92, an opening 93 which the reed switch 100 penetrates may be formed. By this configuration, the reed switch 100 may be positioned between the hinge cover 90 and the hinge bracket 81 such that an upper surface of the reed switch 100 is exposed upward from the hinge cover 90.

The reed switch 100 may be connected with wires 102 and 106 for supplying electricity to the reed switch 100. The wires 102 and 106 may be connected with a power supply provided in the main body 10.

As illustrated in FIG. 5, the wires 102 and 106 may include a first wire 106 and a second wire 102. One end of the first wire 106 may be connected with the power supply, and a first connector 107 may be provided in the other end. One end of the second wire 102 may be connected with the reed switch 100, and a second connector 103 that may be connected with the first connector 107 may be provided in the other end.

As illustrated in FIGS. 5 and 7, the second wire 102 may pass through the through hole 52 of the front plate 51 together with the hinge 80 and the hinge cover 90. That is, a space may be formed between the hinge 80 and the hinge cover 90, and the second wire 102 may be positioned in the space. The second wire 102 and the second connector 103 may pass through the fixing plate 82 of the hinge bracket 81 and the insertion portion 97 of the hinge cover 90 and be connected with the first connector 107.

The first connector 107 may be connected with the second connector 103 inside the upper cap 60. More specifically, the first connector 107 may be connected with the second connector 103 in the hinge accommodating space 65 of the upper cap 60. As such, because the first connector 107 is connected with the second connector 103 inside the upper cap 60, a task of connecting the first connector 107 with the second connector 103 may be easily performed.

The magnet 75 may be mounted on an upper end of the rear surface of the outer door 36. For this, a magnet mounting groove 72 on which the magnet 75 is mounted may be formed in the upper end of the rear surface of the outer door 36.

In a closed state of the outer door 36, the reed switch 100 and the magnet 75 may be positioned vertically. More specifically, in a closed state of the outer door 36, the magnet 75 may be positioned vertically above the reed switch 100.

In the rear surface 79 of the outer door 36, a hinge accommodating groove 71 depressed to accommodate the hinge 80 and the hinge cover 90 upon closing of the outer door 36 may be formed, and the magnet mounting groove 72 may be formed above the hinge accommodating groove 71. By this configuration, in a closed state of the outer door 36, the reed switch 100 and the magnet 75 may be positioned vertically.

In a case in which the reed switch 100 and the magnet 75 are positioned horizontally, the outer door 36 may need to have a large thickness to secure a separation distance between the reed switch 100 and the magnet 75. However, according to one or more embodiments, because the reed switch 100 and the magnet 75 are positioned vertically, a minimal separation distance between the reed switch 100 and the magnet 75 may be secured without increasing the thickness of the outer door 36.

Figure 10:
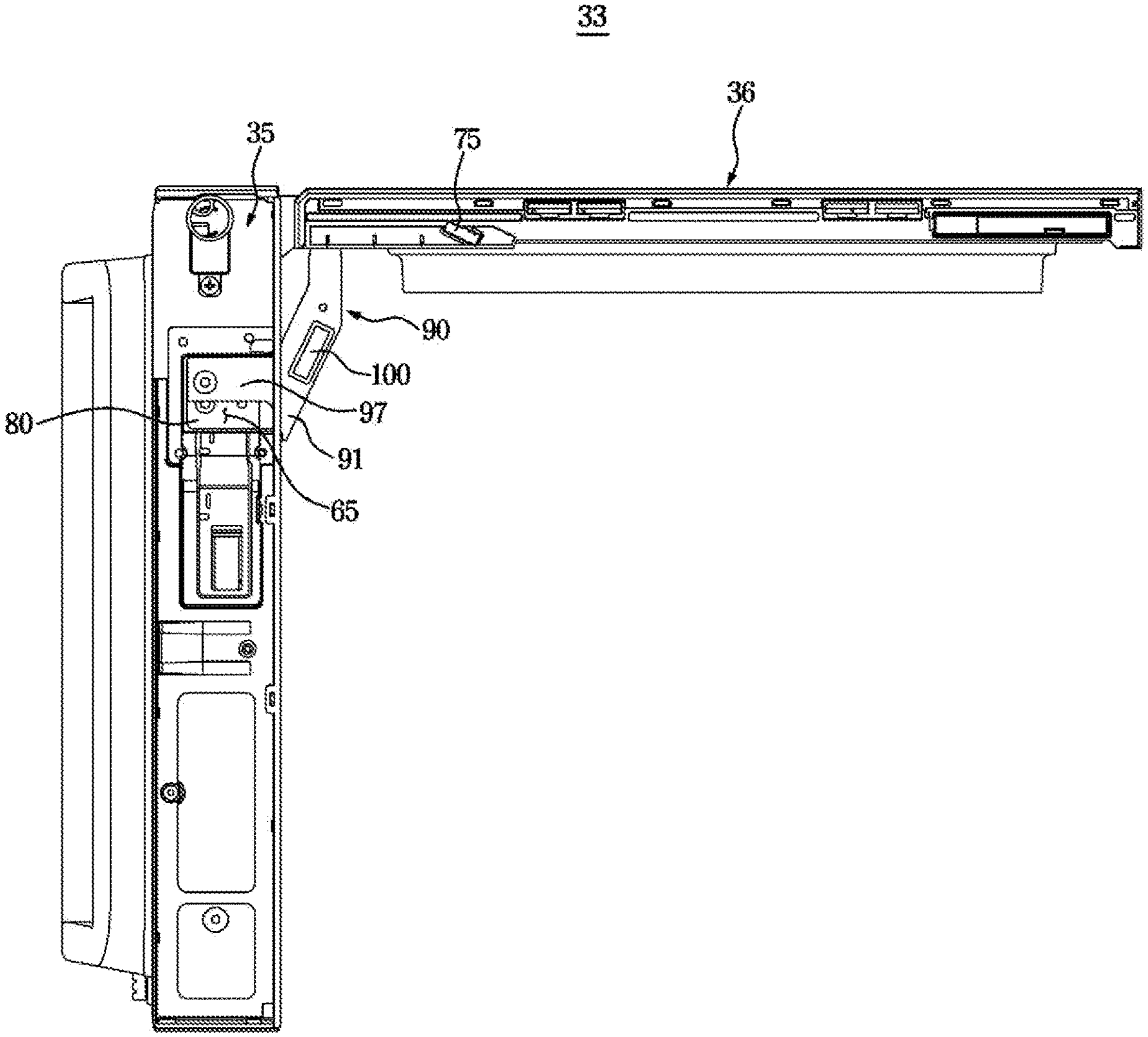
FIG. 10 is a top view showing a state in which an outer door opens by about 90 degrees in a refrigerator, according to an embodiment.
Figure 11:
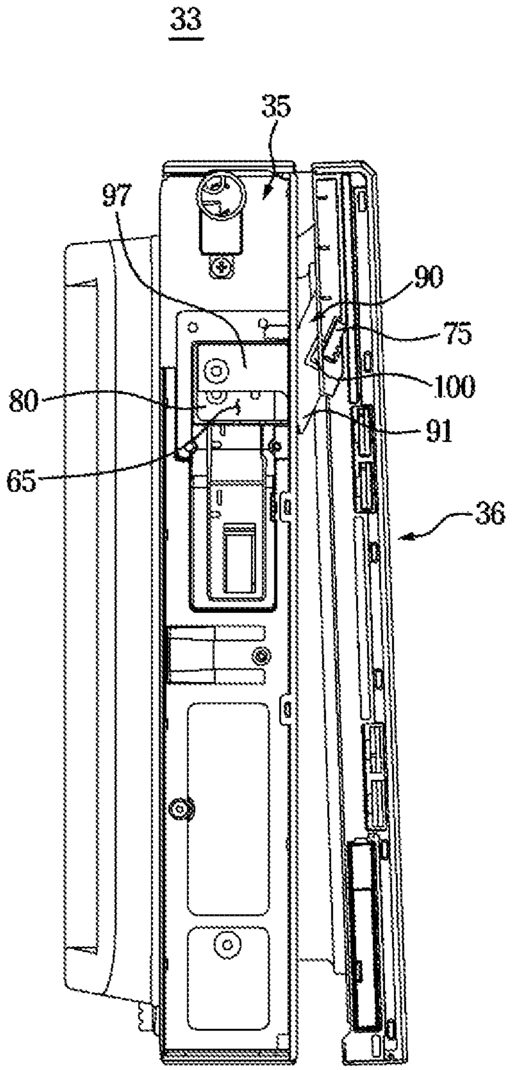
FIG. 11 is a top view showing a state in which an outer door opens by about 2 degrees in a refrigerator, according to an embodiment.

FIG. 10 is a top view showing a state in which an outer door opens by about 90 degrees in a refrigerator according to an embodiment. FIG. 11 is a top view showing a state in which an outer door opens by about 2 degrees in a refrigerator according to an embodiment.

An internal light of the storage area may be turned off upon closing of the outer door 35, and turned on upon opening of the outer door 35.

As illustrated in FIG. 10, in an open state of the outer door 36 with respect to the inner door 35, the reed switch 100 may fail to detect the magnet 75 and accordingly, the internal light of the storage area may be in a turned-on state. According to a rotation of the outer door 36, the magnet 75 installed in the outer door 36 may rotate together with the outer door 36.

As illustrated in FIG. 11, according to a rotation of the outer door 36 in a direction in which the outer door 36 is closed such that an angle between the outer door 36 and the inner door 35 reaches a preset angle, the reed switch 100 may detect the magnet 75 and accordingly, the internal light of the storage area may be turned off.

An opening/closing of the outer door 35 may be detected depending on whether or not the reed switch 100 mounted on the upper surface of the hinge cover 90 detects the magnet 75 mounted on the rear surface of the outer door 36. That is, opening/closing of the outer door 35 may be detected according to a separation distance between the reed switch 100 mounted on the hinge cover 90 and the magnet 75 mounted on the rear surface of the outer door 36.

The reed switch 100 may have a preset detection range. That is, the reed switch 100 may detect the magnet 75 being within the preset detection range, and may fail to detect the magnet 75 being out of the preset detection range. For example, the detection range may be a shape of a sphere having a radius of R mm from the reed switch 100. Because the R value of the reed switch 100 is a fixed value, the reed switch 100 and the magnet 75 may be positioned such that a separation distance between the reed switch 100 and the magnet 75 in a closed state of the outer door 36 is R or close to R, to accurately detect an opening/closing of the outer door 36.

As described above, according to an embodiment, in a closed state of the outer door 36, the reed switch 100 mounted on the hinge cover 90 may be positioned vertically to the magnet 75 mounted on the rear surface of the outer door 36. Accordingly, even in the closed state of the outer door 36, a separation distance in vertical direction between the reed switch 100 and the magnet 75 may be secured.

In the case in which the reed switch 100 and the magnet 75 are positioned horizontally, the magnet 55 may need to be positioned at an area depressed by a preset depth from the rear surface of the outer door 36 to secure a separation distance between the reed switch 100 and the magnet 75, which may cause a unnecessary increase of the thickness of the outer door 36. However, according to an embodiment, the reed switch 100 and the magnet 75 may be positioned to accurately detect opening/closing of the outer door 36 without unnecessarily increasing the thickness of the outer door 36.

Although technical concepts have been described based on specific embodiments, the scope of rights of the disclosure is not limited to these embodiments. It should be understood that various embodiments modified or changed by a person skilled in the art within a scope not deviating from the gist of the disclosure as the technical concept of the disclosure, which is defined in the claims, also belong to the scope of rights of the disclosure.

What is claimed is:

1. A refrigerator comprising:

a main body comprising a storage area;

an inner door comprising a door storage space, the inner door being rotatably coupled with the main body;

an outer door;

a hinge rotatably coupling the outer door with the inner door, the hinge comprising a hinge bracket that comprises a fixing plate coupled with the inner door, and a hinge shaft on which the outer door is rotatable; and a hinge cover covering a portion of the hinge bracket, the portion being positioned outside the inner door, wherein the inner door further comprises a front plate forming a front surface of the inner door, and an upper cap coupled with an upper end of the front plate, wherein the front plate comprises a through hole spaced a first gap from an upper edge of the front plate and spaced a second gap from a side edge of the front plate, wherein the hinge bracket penetrates the through hole such that the fixing plate is coupled with the upper cap and is positioned inside the inner door, and wherein the hinge cover penetrates the through hole.

2. The refrigerator of claim 1, wherein the upper cap comprises a flat installing portion contacting the fixing plate, and wherein the refrigerator further comprises a coupling member coupling the fixing plate is coupled with the flat installing portion.

3. The refrigerator of claim 1, wherein the upper cap comprises an upper cap hole corresponding to the through hole, and wherein the hinge bracket penetrates the upper cap hole.

4. The refrigerator of claim 1, further comprising a reed switch configured to detect opening and closing of the outer door, and wherein the reed switch is provided on the hinge cover.

5. The refrigerator of claim 4, wherein the hinge cover comprises an upper cover covering an upper surface of the hinge, and a side cover covering a side surface of the hinge, and the reed switch is provided on the upper cover.

6. The refrigerator of claim 5, wherein the upper cover comprises a switch supporter supporting an edge of the reed switch, and wherein the upper cover comprises an opening that the reed switch penetrates.

7. The refrigerator of claim 4, further comprising a wire connected with the reed switch and configured to supply electricity to the reed switch, wherein the wire passes through the through hole.

8. The refrigerator of claim 7, wherein the wire comprises:

a first wire having a first end connected with a power supply of the main body, and a second end at which a first connector is provided; and a second wire having a first end connected with the reed switch, and a second end at which a second connector is provided, the second connector being coupled with the first connector, and wherein the first connector and the second connector are positioned in a hinge accommodating space formed in the upper cap.

9. The refrigerator of claim 4, further comprising a magnet provided on the outer door and configured to interwork with the reed switch.

10. The refrigerator of claim 9, wherein, in a closed state of the outer door, the reed switch and the magnet are positioned vertically.

11. The refrigerator of claim 9, wherein the outer door comprises a hinge accommodating groove depressed in a rear surface of the outer door and configured to accommodate the hinge cover in a closed state of the outer door.

12. The refrigerator of claim 11, wherein the outer door comprises a magnet mounting groove on which the magnet is mounted, and wherein the magnet mounting groove is formed above the hinge accommodating groove.

13. A refrigerator comprising:

a refrigerator door comprising an inner door and an outer door, the inner door being coupled with a main body, and the outer door being coupled with the inner door, wherein the inner door further comprises a front plate comprising a through hole spaced a first gap from an upper edge of the front plate and spaced a second gap from a side edge of the front plate;

a hinge comprising a hinge bracket coupled with the inner door;

a hinge cover covering a portion of the hinge bracket that is positioned outside the inner door, wherein the hinge cover penetrates the through hole; and a reed switch configured to detect opening and closing of the outer door based on an interworking between the reed switch and a magnet, wherein the reed switch and the magnet are positioned vertically with respect to each other when the refrigerator door is closed, and wherein the inner door comprises the front plate forming a front surface of the inner door, and an upper cap coupled with an upper end of the front plate.

14. The refrigerator of claim 13, wherein the reed switch is further configured to detect the refrigerator door is closed based on a distance between the reed switch and the magnet being less than a predetermined distance.

15. The refrigerator of claim 13, wherein the reed switch is provided on the hinge cover.

* * * * *